United States Patent Office 3,705,955
Patented Dec. 12, 1972

3,705,955
BLIND LANDING AID SYSTEMS
George Assouline, Pierre Conjeaud, Pierre Girault, and Eugene Leiba, Paris, France, assignors to Thomson-CSF
Filed Jan. 9, 1970, Ser. No. 2,191
Claims priority, application France, Jan. 24, 1969, 6901403
Int. Cl. H04n 3/08
U.S. Cl. 178—6.8                         6 Claims

ABSTRACT OF THE DISCLOSURE

A blind landing aid system, for visualizing, on board an aircraft, a landing runway this aircraft is approaching, this system comprising an infrared laser source, a device for causing the beam emitted by this source to scan the ground, in front of the aircraft, according to a television pattern, reflector beacons bounding the runway for reflecting back on itself any incident infrared beam, a receiver for detecting the infrared beam emitted by this source after reflection on these beacons, and a cathode-ray tube whose screen is scanned in synchronism with the scanning performed by the infrared beam and whose electron beam is controlled by the signals supplied by the receiver, so as to visualize the beacons as luminous spots on the screen of the cathode-ray tube.

---

The present invention relates to blind landing. More particularly it relates to a system for displaying, on board the aircraft, the runway, even under poor visibility conditions, for example because of fog.

As is well known a pilot may not perform a landing when the visibility is below a certain minimum; for example this limit is 300 metres for airline operations.

This limit corresponds to attenuation of visible light by mist or fog, which is in the order of 56 db/km. However, it has been established that infrared radiation is much less attenuated by fog than is visible light and all the more so the longer the wavelength used.

It is an object of this invention to make use of this feature to provide on board the aircraft a visual display of the runway as it is viewed by the pilot in clear weather, this even in foggy conditions and at distances from the runway which are well in excess of the visibility threshold. This should make it possible to carry out landings even in atmospheric conditions where landing is otherwise impossible and should improve safety in situations where visibility is poor although not so poor as to prevent landing.

According to the invention, there is provided a blind landing aid system for visualizing, on board an aircraft, the landing runway said aircraft is approaching, said system comprising: transmitting means on board said aircraft for emitting an infrared laser beam for scanning the ground in front of said aircraft in accordance with a predetermined pattern; reflecting beacons bounding said runway for reflecting said infrared laser beam in a direction parallel thereto upon being swept by said beam; and receiving means, on board said aircraft, comprising a cathode-ray tube having a screen and means for scanning said screen in synchronism with the scanning performed by said infrared laser beam, for receiving said infrared laser beam reflected by said beacons and for visualizing said beacons as luminous spots on said screen.

For a better understanding of the invention and to show how the same may be carried into effect, reference will be made to the drawings accompanying the ensuing description and in which.

Figure 1:
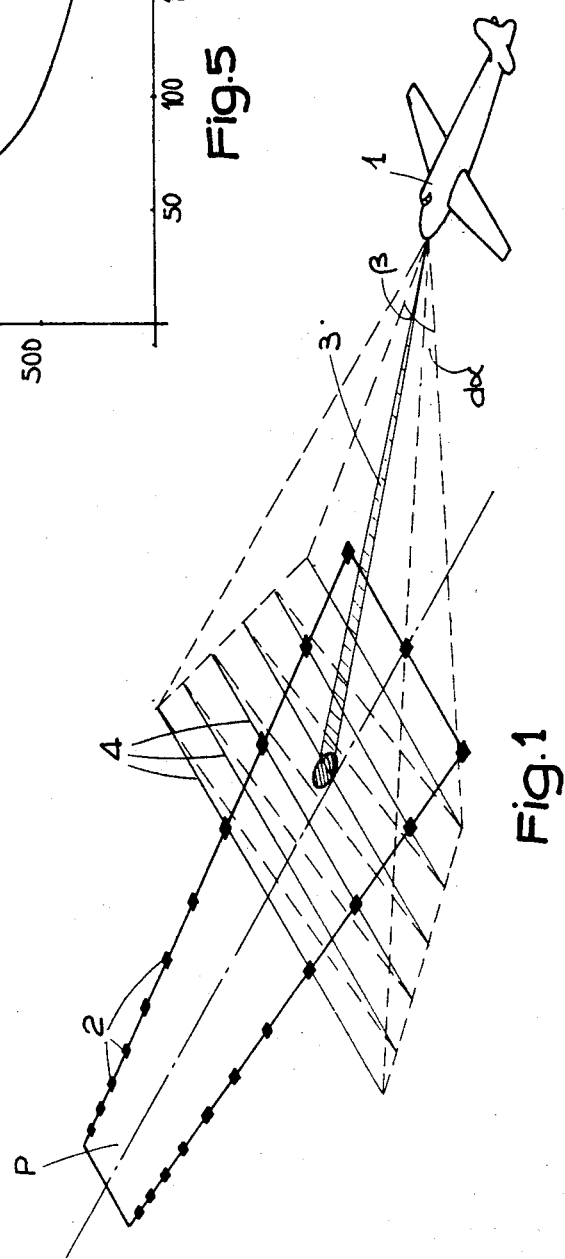
FIG. 1 is an explanatory diagram outlining the principle of the invention.

In FIG. 1, an aircraft 1 is shown in final approach to the runway P marked by beacons 2.

For the landing to be performed safely, the pilot must see an adequate number of runway beacons 2 in order to visualize the runway axis.

The system in accordance with the invention provides for the use, in the aircraft 1, of an infrared laser beam 3 which scans the ground in front of the aircraft along a television pattern 4 (certain dimensions have been greatly exaggerated in the figure for the sake of clarity). The runway P is marked by runway beacons 2 which, when swept by the laser beam, reflect it back in the direction from which it came.

The aircraft carries a cathode-ray tube the spot of which scans the screen synchronously with the scanning performed by the laser beam, the spot brightness being controlled by the signals coming from a receiver which receives the infrared radiation reflected by the runway beacons. Thus, the beacons, which were swept by the laser infrared beam, are displayed on the screen of the tube in the form of spots.

The advantage of this system is that the range of infrared radiation is substantially in excess of that of visible light under foggy conditions: the pilot can thus see, on his aircraft screen, the alignment of the beacons lining the edges of the runway, even where they are actually invisible to the naked eye.

Bearing this in mind, it will be evident that the range of scan should be sufficient for the pilot to be able at all times to see a sufficient number of runway beacons on the screen, between the time at which the aircraft is at a predetermined distance from the runway and the time of touchdown.

Actually, the pilot has to see a certain number of beacons, if he is to be able to visualize the runway axis and assess the distance from the aircraft to the runway by an assessment of the spacing of the runway beacons and the perspective.

The angular amplitude $\beta$ of horizontal scan, and the angular amplitude $d\alpha$ of vertical scan, as well as the mean inclination $\alpha$ of the laser beam in relation to the horizontal, are therefore to be selected accordingly.

Figure 2:
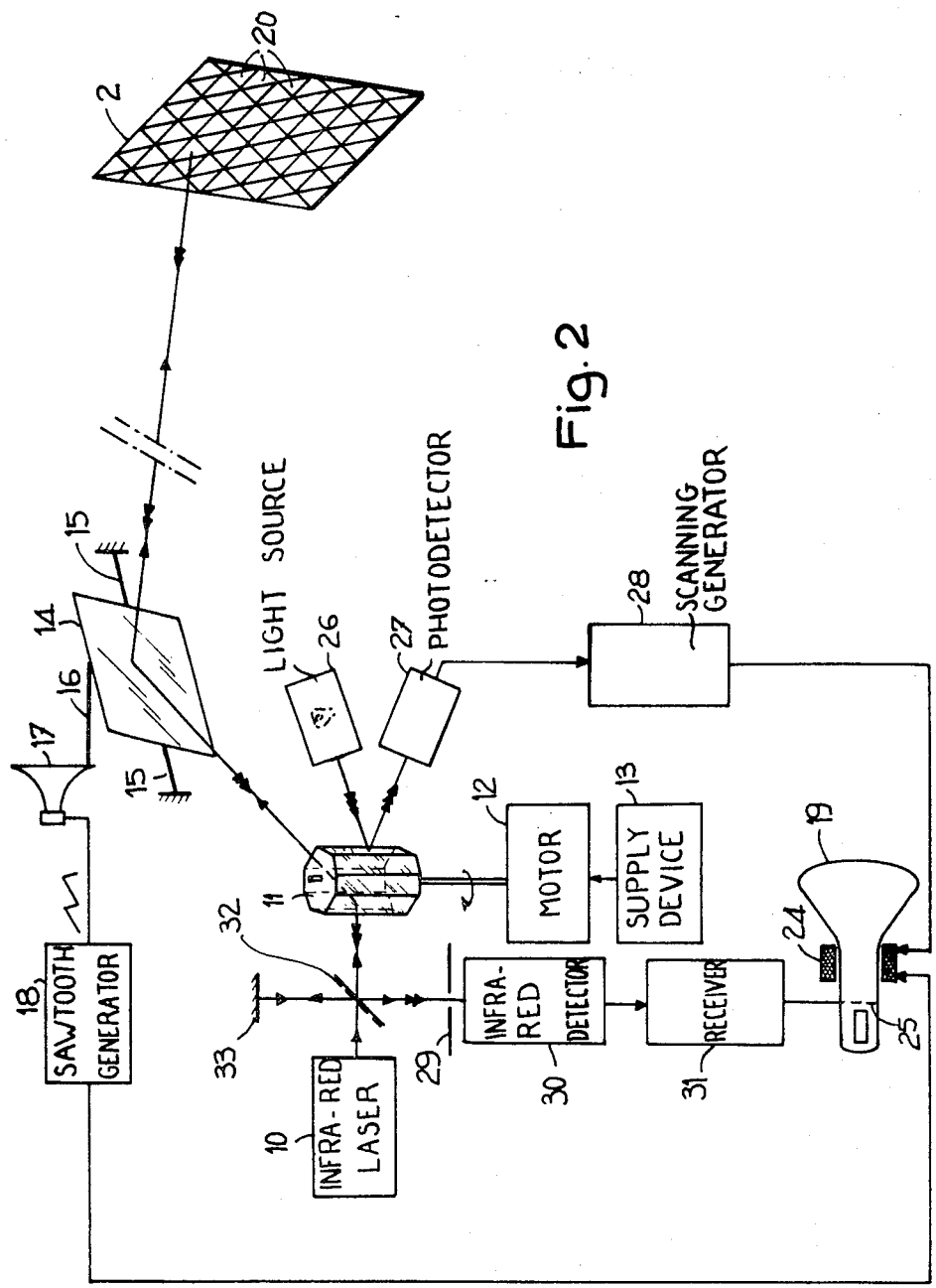
FIG. 2 illustrates a diagram of a system in accordance with the invention.

In FIG. 2, a diagram of the system in accordance with the invention has been illustrated. Each runway beacon 2 comprises a reflector formed of reflector elements 20 of the "cube corner" kind arranged side by side.

Figure 3:
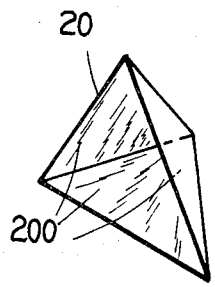
FIG. 3 illustrates an element of a runway beacon for the system in accordance with the invention.

Such an element 20 is illustrated in FIG. 3. It is formed by a tri-rectangular trihedron with three reflective internal faces 200. A reflector made up of elements of this kind has the well known property that it reflects all the incident radiation parallel to itself whatever the angle of incidence.

On board the aircraft, there is a transceiver arrangement comprising a laser 10 for producing an infrared beam. Horizontal scanning is performed by the beam by means of a rotary mirror 11 constituted by an $n$-faceted prism, the number $n$ being selected as a function of the angular amplitude of scan required. The mirror 11 is driven by a motor 12 controlled and stabilized in speed by a supply device 13. The speed of the motor is a function of the desired horizontal scanning frequency, which is equal to the product of the speed of the motor in revolutions per second by the number $n$.

The mirror 11 is arranged in such fashion as to impress on the laser beam a mean deflection of 90°. This beam is reflected by a mirror 14 arranged at 45° and assembled on torsion bars 15 located in the incidence plane. It is given a low-amplitude oscillatory movement about said bars by the diaphragm of a loudspeaker 17, in order to cause the laser beam to perform vertical scanning. Of course, any other arrangement, such as a cam arrangement, may be used to oscillate the mirror 14.

The loudspeaker diaphragm is given an appropriate movement by means of a sawtooth generator 18 operating at the desired vertical frequency. The transceiver arrangement comprises, in addition, a cathode-ray tube 19, the electron beam of which scans the screen in synchronism with the beam scanning. For this purpose, the vertical deflection coils are supplied with the sawtooth signals produced by the generator 18. The horizontal deflection coils are supplied by a scanning generator 28. The latter is synchronized by the pulses furnished by a photodetector 27, and the latter in turn receives a light beam produced by an auxiliary light source 26 and reflected by the rotary mirror 11.

The transceiver arrangement comprises a heterodyne receiver device with a detector 30 with its input diaphragm 29, a semi-reflective mirror 32, a reference mirror 33 producing the "local oscillator" beam, and a receiver 31 connected to the detector 30 and whose output is connected to the control electrode 25 of the tube 19.

The operation of the system is as follows:

When the infrared laser beam strikes a runway beacon, it is reflected back on itself and, through the medium of the semi-reflective mirror 32 arranged at 45°, is passed to the detector 30. On the other hand, part of the initial laser beam after reflection by the mirror 32 and the mirror 33 and passage through the mirror 32, is likewise transmitted to the detector 30 and acts as a local oscillator signal for purposes of heterodyne detection. The frequency of the wave reflected by the runway beacon 2 differs from the frequency of the laser wave 10 by frequency $F_D$ which is the Doppler frequency due to the displacement of the aircraft and which is equal to $2v/\lambda$, where $v$ is the speed of the aircraft and $\lambda$ the wavelength of the wave transmitted by the laser 10. The receiver 31 has input circuits tuned to the frequency $F_D$ and makes it possible to obtain, from the Doppler frequency pulse, a pulse which is applied to the control electrode 35 of the tube 19 in order to produce the appearance, upon the tube screen, of a luminous spot representing the position of the runway beacon.

This kind of optical heterodyne detection has the advantage, over conventional modes of detection of the reflected beam, that it has a sensitivity which is better by several orders of magnitude.

The detector 30 which is used must have a sufficiently short response time, since the frequency $F_D$ is relatively high, and accordingly it is possible for example to use a cooled quantic detector.

Figure 4:
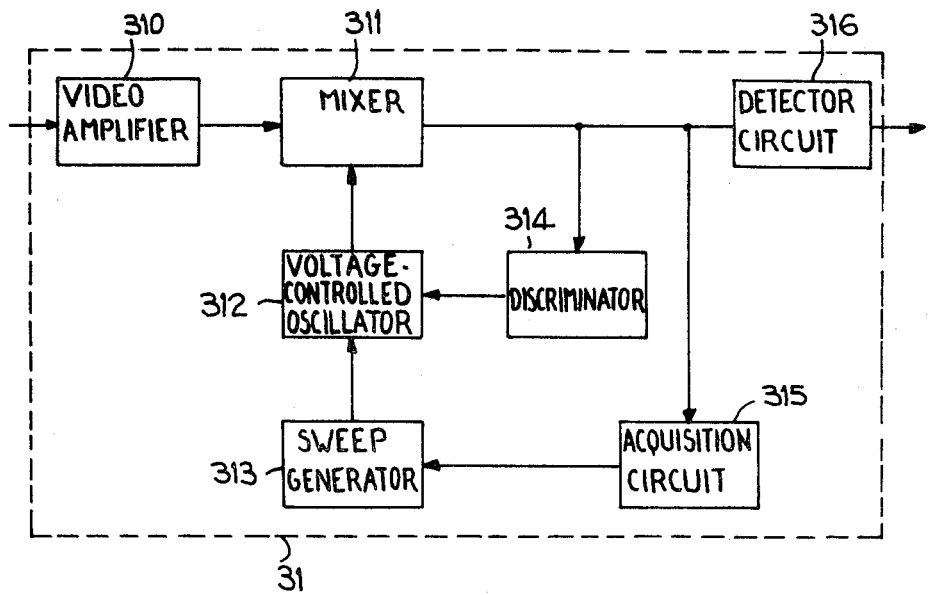
FIG. 4 illustrates a diagram of the receiver circuit of the system in accordance with the invention.

On the other hand, calculations show that, for heterodyne detection, the sensitivity is the better the narrower the passband of the detector device. Accordingly, a very narrow-band receiver will be preferably used, for example that diagrammatically shown in FIG. 4. It comprises a video amplifier 310 which receives from the detector 30 the pulses at Doppler frequency $F_D$.

By way of example, this frequency is somewhere between 14 and 17 mc./s. when the aircraft speed, on final approach, varies between 250 and 300 km./h. and when a wavelength of 10 microns is used (carbon dioxide laser).

The amplifier 310 is connected to a mixer 311, which receives, on the other hand, a signal of variable frequency $F_1$ from a voltage-controlled oscillator 312. This oscillator 312 is controlled by the signals furnished by a discriminator 314 of very narrow bandwidth, centered on a predetermined intermediate frequency $F_I$ and connected to the output of the mixer 311.

The oscillator 312 comprises a further control input which receives the signals from a sweep generator 313 which can be blocked by a signal supplied by an acquisition circuit 315 connected to the output of the mixer 311 and comprising a very narrow-band filter centered on the frequency $F_I$. The output signal from the mixer 311 is also fed to a detector circuit 316 which eliminates the oscillations of frequency $F_I$ and produces a control pulse. The operation of this receiver with a narrow-band frequency-lock loop (this kind of receiver is well known), is as follows:

Since the frequency-lock loop comprising the oscillator 312 and the discriminator 314 has a very narrow bandwidth, the frequency of the oscillator 312 has to be brought to a value $F_1$ such that $F_1-F_D$ differs very little from $F_I$, i.e., is within the passband of the discriminator 314. At this time, the loop becomes operative, and the discriminator 314 can perform its function and produce an error signal which controls the frequency of the oscillator 312 as soon as the frequency $F_D$ varies, tending to shift the frequency of the output signal from the mixer 311, away from the value $F_I$.

In order to bring the oscillator frequency to the requisite value for the locking to be effective, it is necessary to provide a search phase during which the oscillator 312 is made to scan the range of frequencies between $F_I+F_{Dm}$ and $F_I+F_{DM}$, where $F_{Dm}$ and $F_{DM}$ are the Doppler frequencies corresponding to the extreme speeds of the aircraft during final approach.

For this purpose, a sweep generator 313 is used which supplies a sweep signal to the voltage-controlled oscillator 312.

When the oscillator frequency passes through the correct value and the loop locks on, the acquisition circuit receives a signal whose frequency falls within the passband centred on $F_I$, and supplies a blocking signal to the generator 313 which stops scanning.

The loop normally remains locked on as long as the laser beam impinges upon the runway beacon 2 and is reflected. As soon as the laser beam passes away from the runway beacon considered or in the event that the loop accidentally unlocks, the search phase starts again.

Figure 5:
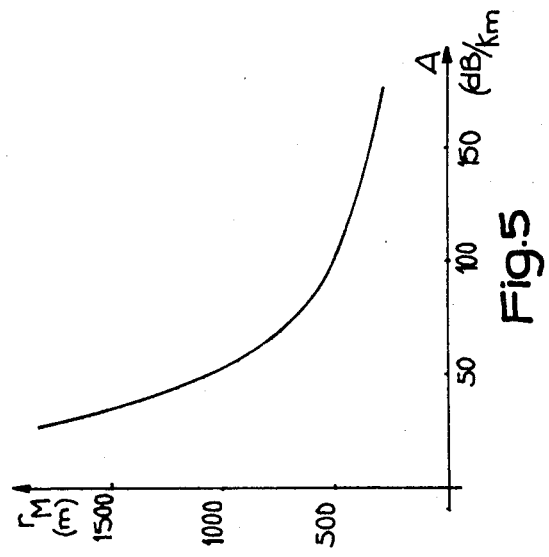
FIG. 5 is an explanatory graph.

In FIG. 5, the variation in the maximum range $r_M$ of the system in accordance with the invention, has been represented as a function of the attenuation A in decibels per kilometre produced by fog at the wavelength of 10.6 microns, the latter corresponding to the carbon dioxide laser used. At this wavelength, the propagation through the atmosphere is excellent.

It will be noted from a consideration of this curve that for an attenuation of 30 db/km. at a wavelength of 10 microns, corresponding to a visibility threshold of less than 300 meters, the range of the system is in the order of 1600 meters, which enables landing to be carried out under very safe conditions. Of course, other wavelengths can be used.

In particular, a cyanide gas laser produces a wavelength of 336 microns, for which, while the propagation through the atmosphere is substantially poorer, although there is a transmission "window," the attenuation by fog is very small indeed.

Obviously, the laser transmitter of the system in accordance with the invention could be associated with a device for compensating the drift and pitch angles of the aircraft.

Of course, the invention is in no way limited to the example described which was given solely by way of example.

What is claimed is:

1. A transmitting-receiving apparatus for use in a blind landing aid system allowing the visualization, on board an aircraft, of the landing runaway said aircraft is approaching, said apparatus comprising: transmitting means on board said aircraft including an infrared laser source for emitting an infrared laser beam toward the ground in front of said aircraft; scanning means for scanning the ground in front of said aircraft, in accordance with a predetermined pattern; a receiver comprising an infrared detector for receiving the infrared laser beam reflected by reflecting beacons bounding said runaway; a cathode-ray tube having a control electrode, connected to said receiver, and deflection means for scanning the screen of said cathode-ray tube in synchronism with the scanning performed by said infrared laser beam; and synchronizing means, coupled to said scanning means and to said deflection means, for synchronizing the scanning of said screen and the scanning of the ground performed by said infrared laser beam; said receiver comprising means for transmitting to said infrared detector a reference infrared beam emitted by said source and said beam reflected by said beacons and narrow band frequency-lock loop means connected to said detector for transmitting a control pulse to said control electrode upon reception of a beam, reflected by any one of said beacons, by said detector.

2. An apparatus as claimed in claim 1, wherein said frequency-lock loop means comprise: a mixer having a first input, connected to said infrared detector, a second input and an output for supplying an intermediate-frequency signal; a voltage-controlled oscillator connected to said second input and having a first and a second control input; a narrow band frequency discriminator having a center frequency equal to said intermediate frequency and connected between said mixer output and said first control input; a sweep generator having a blocking input and an output connected to said second control input; an acquisition circuit comprising a narrow band filter centred on said intermediate frequency and connected between said mixer output and said blocking input; and a detector circuit connected to said mixer output and having an output for supplying said control pulses.

3. An apparatus as claimed in claim 1, wherein said means for transmitting to said infrared detector a reference infrared beam, emitted by said source, and said beam reflected by said beacons comprise; a semi-reflective mirror located, between said source and said scanning means, at an angle of 45° from the beam emitted by said source, for reflecting towards said infrared detector a part of said beam reflected by said beacons and received through said scanning means; and a plane mirror located for reflecting, towards said detector through said semi-reflective mirror, the part of said beam emitted by said source which is reflected by said semi-reflective mirror.

4. A blind landing aid system as claimed in claim 1, wherein each of said reflecting beacons comprises an arrangement side by side of cube corner reflectors.

5. An apparatus as claimed in claim 1, wherein said scanning means comprise; a first rotating prism having mirror facets and located for deviating said beam by a mean angle substantially equal to 90°; means for rotating said prism at a predetermined speed; a plane mirror located at an angle of substantially 45° from the mean direction of the beam reflected by said prism; means for mounting said plane mirror rotatably about an axis located in the plane of incidence of said beam on said prism facets; and oscillating means coupled to said plane mirror for oscillating said plane mirror about said axis.

6. An apparatus as claimed in claim 5, wherein said synchronizing means comprise an auxiliary light source for emitting a light beam towards said mirror scanner; and a photo-detector located for detecting said light beam after reflection on said mirror scanner.

References Cited
UNITED STATES PATENTS

| | | | |
|---|---|---|---|
| 2,288,871 | 7/1942 | Adams | 178—DIG. 20 |
| 2,396,112 | 3/1946 | Morgan | 343—18 C |
| 2,075,808 | 4/1937 | Fliess | 178—DIG. 8 |
| 2,944,151 | 7/1960 | Whitney et al. | 250—83.3 H |

OTHER REFERENCES

"TV Eystem Uses Laser Beam To See in Dark," IEEE Spectrum, January 1966, pp. 138, 139.

ROBERT L. GRIFFIN, Primary Examiner

R. K. ECKERT, JR., Assistant Examiner

U.S. Cl. X.R.

178—DIG. 8, DIG. 20, 7.6; 250—83.3 H